(12) United States Patent
Sonnendorfer et al.

(10) Patent No.: US 10,210,503 B2
(45) Date of Patent: Feb. 19, 2019

(54) MOUNT FOR A MOBILE TERMINAL DEVICE FOR USE AS A SELF-SCANNER PAYMENT SYSTEM, MOBILE TELECOMMUNICATIONS TERMINAL DEVICE, SCANNER WALL AND SOFTWARE FOR LOCKING AND/OR UNLOCKING THE MOUNT

(71) Applicants: Andreas Filosi, Puchheim (DE); Elvira Sonnendorfer, Puchheim (DE)

(72) Inventors: Horst Sonnendorfer, Puchheim (DE); Franz Wieth, Puchheim (DE)

(73) Assignees: Franz Wieth, Puchheim (DE); Andreas Filosi, Puchheim (DE)

( * ) Notice: Subject to any disclaimer, the term of this patent is extended or adjusted under 35 U.S.C. 154(b) by 442 days.

(21) Appl. No.: 14/513,812

(22) Filed: Oct. 14, 2014

(65) Prior Publication Data

US 2015/0032559 A1    Jan. 29, 2015

Related U.S. Application Data

(63) Continuation of application No. PCT/EP2013/057695, filed on Apr. 12, 2013.

(30) Foreign Application Priority Data

Apr. 13, 2012  (DE) .................. 10 2012 103 200
Jun. 1, 2012  (DE) .................. 10 2012 104 772

(51) Int. Cl.
*G06G 1/12* (2006.01)
*G06Q 20/00* (2012.01)
(Continued)

(52) U.S. Cl.
CPC ..... *G06Q 20/3276* (2013.01); *G06F 13/4081* (2013.01); *G06Q 20/202* (2013.01);
(Continued)

(58) Field of Classification Search
None
See application file for complete search history.

(56) References Cited

U.S. PATENT DOCUMENTS 5,361,871 A * 11/1994 Gupta ................... B62B 3/1408
                                                      186/52
6,002,921 A * 12/1999 Pfahlert .............. B60R 11/0241
                                                      455/420

(Continued)

FOREIGN PATENT DOCUMENTS

DE        29601036 U1    5/1996
DE        29714013 U1    11/1997
(Continued)

*Primary Examiner* — Ariel J Yu
(74) *Attorney, Agent, or Firm* — Laurence A. Greenberg; Werner H. Stemer; Ralph E. Locher

(57) ABSTRACT

A mount for a mobile telecommunications terminal device includes a receptacle for the mobile telecommunications terminal device, a first interface for transmitting data from the mobile telecommunications terminal device to the mount, a second interface for transmitting data from the mount to a point-of-sale or cash register system and a first fastening device for detachably fastening the mount to a shopping cart. A payment system, a mobile telecommunications terminal device, a scanner wall and software for locking and/or unlocking the mount are also provided.

16 Claims, 11 Drawing Sheets

(51) Int. Cl.
  *G06K 15/00*    (2006.01)
  *G06K 7/00*     (2006.01)
  *G06Q 20/32*    (2012.01)
  *H04M 1/02*     (2006.01)
  *H04M 1/725*    (2006.01)
  *H04M 1/04*     (2006.01)
  *G06F 13/40*    (2006.01)
  *G06Q 20/20*    (2012.01)
  *B62B 3/14*     (2006.01)

(52) U.S. Cl.
  CPC .......... *H04M 1/0254* (2013.01); *H04M 1/04* (2013.01); *H04M 1/7253* (2013.01); *H04M 1/72527* (2013.01); *B62B 3/1428* (2013.01)

(56) References Cited

U.S. PATENT DOCUMENTS

| | | | |
|---|---|---|---|
| 6,105,867 A | 8/2000 | Shimizu et al. | |
| 6,409,086 B1* | 6/2002 | Pellaumail | G06Q 20/343 235/462.13 |
| 6,708,887 B1 | 3/2004 | Garrett et al. | |
| 7,195,157 B2 | 3/2007 | Swartz et al. | |
| 8,136,275 B2 | 3/2012 | Sonnendorfer et al. | |
| 8,152,062 B2 | 4/2012 | Perrier et al. | |
| 8,672,199 B1* | 3/2014 | Ditore | G06F 1/1632 224/411 |
| 2001/0055978 A1* | 12/2001 | Herrod | G06F 1/1626 455/517 |
| 2002/0104887 A1 | 8/2002 | Schlieffers et al. | |
| 2004/0111320 A1* | 6/2004 | Schlieffers | A47F 9/047 705/16 |
| 2004/0238629 A1 | 12/2004 | Buchholz | |
| 2009/0092343 A1* | 4/2009 | Thomson | A45C 13/103 383/64 |
| 2009/0156067 A1* | 6/2009 | Rudduck | F16B 1/00 439/888 |
| 2009/0208145 A1* | 8/2009 | Thomson | A45C 13/103 383/6 |
| 2010/0035667 A1 | 2/2010 | Bury | |
| 2013/0090000 A1* | 4/2013 | Zhao | H01R 13/6277 439/370 |
| 2013/0107042 A1* | 5/2013 | Forster | G06K 19/07713 348/143 |

FOREIGN PATENT DOCUMENTS

| | | |
|---|---|---|
| DE | 29803007 U1 | 5/1998 |
| DE | 10221216 A1 | 11/2003 |
| DE | 202010004543 U1 | 10/2011 |
| EP | 0212557 A1 | 3/1987 |
| EP | 0895920 A1 | 2/1999 |
| GB | 2479032 A | 9/2011 |
| JP | H07141569 A | 6/1995 |
| JP | 2001275731 A | 10/2001 |
| KR | 1020010096764 A | 11/2001 |
| KR | 1020070063896 A | 6/2007 |
| RU | 77965 U1 | 11/2008 |
| RU | 2009126663 A | 1/2011 |
| WO | 9830427 A1 | 7/1998 |
| WO | 2006117627 A1 | 11/2006 |

\* cited by examiner ical from a number of viewpoints. The selected goods have already been laid in the shopping cart by the customer during their shopping. To pay, the same must be grasped again by them and laid onto the point-of-sale conveyor belt. After ending the payment procedure, the customer loads the same again, for example in order also to be able to transport the same in the shopping cart as far as the car.

MOUNT FOR A MOBILE TERMINAL DEVICE FOR USE AS A SELF-SCANNER PAYMENT SYSTEM, MOBILE TELECOMMUNICATIONS TERMINAL DEVICE, SCANNER WALL AND SOFTWARE FOR LOCKING AND/OR UNLOCKING THE MOUNT

CROSS-REFERENCE TO RELATED APPLICATION

This is a continuation, under 35 U.S.C. § 120, of copending International Application No. PCT/EP2013/057695, filed Apr. 12, 2013, which designated the United States; this application also claims the priority, under 35 U.S.C. § 119, of German Patent Application DE 10 2012 103 200.9, filed Apr. 13, 2012 and German Patent Application DE 10 2012 104 772.3, filed Jun. 1, 2012; the prior applications are herewith incorporated by reference in their entirety.

BACKGROUND OF THE INVENTION

Field of the Invention

The invention relates to a mount for a mobile terminal device, in which the mount includes a receptacle for the mobile terminal device. The invention also relates to a payment system, a mobile telecommunications terminal device, a scanner wall and software for locking and/or unlocking the mount.

The point-of-sale systems used for many years in wholesale and retail have the disadvantage that they can only be operated in a very personnel-intensive manner. The point-of-sale personnel must individually grasp the goods to be paid for and read the same into the point-of-sale system in each case via a barcode scanner. The individual scanning in of the goods requires their time, thus the point-of-sale personnel can always only register a limited number of items per minute. In order to prevent queue formation, which is a hindrance for the customer, upstream of the point-of-sale counters, a plurality of point-of-sale counters are therefore often open in parallel. A corresponding number of point-of-sale personnel must be retained.

The entire payment procedure is furthermore impractical from a number of viewpoints. The selected goods have already been laid in the shopping cart by the customer during their shopping. To pay, the same must be grasped again by them and laid onto the point-of-sale conveyor belt. After ending the payment procedure, the customer loads the same again, for example in order also to be able to transport the same in the shopping cart as far as the car.

With the bothersome loading, unloading and re-loading, the customer is expected to take on a large part of the work outlay themselves during payment. That is only accepted by the customer, because their cooperation reduces the waiting time. Laid onto the point-of-sale conveyor belt, the goods are transported to the vicinity of the point-of-sale personnel. That minimizes the required time outlay for scanning, as the movements of the point-of-sale personnel necessary for reading-in the goods are reduced. Thus, the customer supports the point-of-sale personnel and prevents the payment procedure from taking even longer. The customer's cooperation therefore makes sense.

In spite of all optimizations of that process previously carried out, it has not been possible however to overcome the fundamental defect of point-of-sale systems. Each of the goods to be paid for must be grasped and moved multiple times in a complicated manner by using the cooperation of customer and point-of-sale personnel.

It would be practical both for the customer and for the business to avoid the inconvenient loading and unloading required for a payment procedure and thus to be able to reduce the required actions to a minimum. Various approaches have been tried over the past few years. One concept resides in further relieving the point-of-sale personnel and instead to include the customer even further in the payment procedure. What are known as self-scanning systems, which are increasingly being used in grocery retail outlets, offer that possibility. It is the basic principle of such scanning systems that the customer reads in the goods selected by them during their shopping by using a self-scanner allocated to them. At the point-of-sale, the self-scanner merely has to be handed over to the point-of-sale personnel and read and the displayed total amount must be paid. The goods selected by the customer can meanwhile remain in the shopping cart, the inconvenient unloading and re-loading for reading the goods into the point-of-sale system is dispensed with.

However, the use of self-scanners requires a not-inconsiderable capital expenditure for the equipping and retrofitting of the outlets. Each outlet must provide a multiplicity of scanners, adjusted for its size. For large stores with self-scanning systems, it is not unusual for up to 100 self-scanners to be provided, of which each one can cost up to $320.00. In addition, an investment must be made into the associated technology. The capital commitment is all the more problematic, as the self-scanners offer practically no further added value aside from the scanning function and the interface to the point-of-sale counter or cash register.

In contrast with a proprietary self-scanner, modern mobile terminal devices, such as for example smartphones or tablets, are constructed in such a manner that the owner can adapt them to their respective requirements and preferences. They have moved further and further away from their original purpose, the provision of mobile telecommunication. Mobile telephones and tablets available today are much more than just mobile telecommunication terminal devices. Meanwhile, they are networked mobile computers, which are carried by their user at all times and everywhere. The use options thereof are also increasing with the increasing propagation thereof. More and more often, smartphones are also becoming more important in relation to shopping. For example, program applications, so-called apps, are meanwhile available, through the use of which a shopping list can be created on the mobile terminal device while en route or at home and called up in the store during shopping. Furthermore, the terms smartphone and tablet are used as synonyms for mobile telecommunications terminal devices.

SUMMARY OF THE INVENTION

It is accordingly an object of the invention to provide a mount for a mobile terminal device for use as a self-scanner, a payment system, a mobile telecommunications terminal device, a scanner wall and software for locking and/or unlocking the mount, which overcome the hereinafore-mentioned disadvantages of the heretofore-known devices of this general type and which provide an alternative to the known self-scanners, through the use of which shopping can be carried out in just as simple and time-saving a manner and which additionally allows the offering of further functions relating to shopping.

With the foregoing and other objects in view there is provided, in accordance with the invention, a mount for a mobile telecommunications terminal device, the mount comprising a receptacle for the mobile telecommunications terminal device, a first interface for transmitting data from the mobile telecommunications terminal device to the mount, a second interface for transmitting data from the mount to a point-of-sale system, and a first fastening device for releasably fastening the mount on a shopping cart.

With the objects of the invention in view, there is also provided a payment system for wholesale and retail, comprising a mobile telecommunications terminal device, a mount for a mobile telecommunications terminal device according to the invention and a point-of-sale system having an interface for transmitting data from the mount to the point-of-sale system.

With the objects of the invention in view, there is furthermore provided a mobile telecommunications terminal device connected to the mount according to the invention and used as a self-scanner.

With the objects of the invention in view, there is additionally provided a scanner wall, comprising a multiplicity of mounts according to the invention, and a device for identifying a customer.

With the objects of the invention in view, there is further provided a software application, which can be installed on a mobile terminal device, for controlling certain functions of the mount and/or the shopping cart, such as for the electronic locking and/or unlocking of a mount according to the invention.

It is a very important basic concept of the invention to provide a mount of the type mentioned at the beginning, which enables the customer to use their mobile terminal device as a self-scanner. The mount in this case forms a type of adapter for their smartphone, which is brought along into the store by the customer. For this purpose, the mount according to the invention has a first interface for transmitting data from the mobile terminal device to the mount and a second interface for transmitting data from the mount to a point-of-sale system. Furthermore, the mount includes a fastening device or fastener for releasable fastening of the mount on the shopping cart.

Modern mobile terminal devices generally have a camera with a resolution in the megapixel range. The invention makes use of the fact that the quality of this camera is sufficient to record identification codes located on the goods or the packaging thereof, such as barcodes for example. That which the mobile terminal devices lack is an interface, through the use of which they can transmit their data to the proprietary point-of-sale systems. This interface is provided by the mount in the form of the first and second interfaces thereof. The releasable fastening device in this case makes it possible to be able to attach the mobile terminal device to the shopping cart via the mount, as a result of which the customer can use both hands during shopping. The handle of the shopping cart is particularly suitable for attaching the mount, as there it does not hinder the loading of goods into the shopping cart and is always at hand for the customer.

The mobile terminal device of the customer connected to the mount can therefore be used as a self-scanner during shopping. Corresponding program applications for reading a barcode are prevalent meanwhile. They are used in order to identify a product using the smartphone on the basis of the barcode thereof and glean information available about the same on the Internet. Apps are also available, which automatically enter the scanned-in products in a shopping list. These functionalities, which are already used separately, can be incorporated into the self-scanning process by using the mount. The interfaces according to the invention make it possible to transmit data captured by the smartphone to the mount and to transmit from there to a point-of-sale system.

Further optional functions relate to the information about where certain goods are to be found in the visited store, and also guiding the customer through the store, for example by using GPS. Information about certain products can be transmitted to the customer with pinpoint accuracy as a function of the instantaneous position of the customer. Furthermore, it is possible to track the flow of customers in the store and as a result to optimize the presentation areas of the goods. In addition, systems are known meanwhile, which integrate a payment function into a smartphone and thus by interaction with the self-scanning, make the payment procedure even more convenient.

In accordance with another preferred feature of the mount of the invention, the mount has an energy storage device and a third interface for transmitting energy to the mobile terminal device, which is connected to the energy storage device. The charging of the energy storage device in the mobile terminal device, which is therefore possible during shopping, is a bonus, which also additionally motivates the customer to use the mount. The energy storage device is preferably integrated into the mount completely, so that a discharge due to inadvertent contact is prevented. It is rechargeable in particular. A charging carried out before the handover of the mount to the customer makes it possible to always have a satisfactory charging status of the energy storage device. If the energy storage device is releasably fastened on the mount, it can be exchanged in the event of a defect or declining charge capacity.

When numbering the interfaces described herein, it is to be noted that this takes place purely for the sake of clarity. Of course, a plurality of interfaces between two devices can also be combined to form an interface.

In accordance with a further feature of the mount of the invention, the energy storage device of the mount can alternatively or additionally be used to transmit energy to the shopping cart via a fourth interface. Energy at the shopping cart can be used in many ways, but is only to be provided in a complex manner. As an object that is often moving, the shopping cart can only be supplied with energy with difficulty. Either energy storage devices attached to the same must be exchanged repeatedly or the energy storage device must be connected to an external energy source for charging. During the charging process, the shopping cart is then not available for its actual function, the transport of goods. By contrast, the mount according to the invention supplies the shopping cart with energy when the customer attaches the same to a shopping cart. It therefore supplies the energy precisely when the customer is using the shopping cart. The energy supply of the shopping cart guaranteed by the mount enables the use of electrical or electronic components on the shopping cart, for example the operation of a display. In addition, an energy storage device of the shopping cart can be charged by the energy storage device of the mount, so that the functions of the shopping cart consuming energy can be operated further even after the separation of the mount and the shopping cart.

The type of mobile terminal device with which the mount interacts is of no consequence for the suitability thereof as an energy source for the shopping cart. Thus, the suitability of the mount as an energy supplier of the shopping cart is not dependent on the function thereof as a mount for a mobile telecommunications terminal device, but rather can be considered separately therefrom. Thus it is absolutely advantageous to provide this property, even in the case of a mount for a different mobile terminal device, for example a self-scanner.

Each of the wired interfaces of the mount is preferably integrated into the mount in such a manner that a contact to the corresponding wired interface of the mobile terminal device can be produced when inserting a mobile terminal device into the receptacle. The mobile terminal device is therefore also inserted into the wired interface of the mount when inserted into the receptacle. An additional action of the customer is not required. Modern smartphones have standardized interfaces, for example in the form of a Micro USB connector. Thus, a corresponding interface on the mount is suitable for a multiplicity of currently available smartphones from a range of manufacturers.

The same advantage exists for the wired interfaces between mount and shopping cart when fastening the mount. It therefore makes sense to also place the corresponding interfaces between mount and shopping cart or trolley in such a manner that when inserting the mount, a contact to a corresponding wired interface of the shopping cart or shopping-cart handle can be produced.

Like the self-scanners required for the self-scanning, the mount is provided to the customer by the business and issued to them in the store for their shopping. The provision and issuing of the mount can correspond to the known, for the most part automated, issuing stations for the self-scanners. For the most part, the customer finds an automated issuing station in the outlets offering self-scanning visited by them, a so-called scanner wall, from which they can remove a self-scanner for their shopping. Manual issuing of the mount is of course likewise possible.

In addition to the actual storage, the issuing station for the mount can also fulfill additional tasks. On the other hand, the mounts in the issuing station are secured against unauthorized removal. The mount is locked in the issuing station until it is requested by a customer. Before removal, the customer must identify themselves. The identification takes place for example by the reading of their customer card at the issuing station. The customer card is then assigned to a particular one of the mounts held in the issuing station and the lock thereof is released. In addition, it is possible to signal to the customer which mount is ready for removal. This can take place for example by using a light signal.

In order to be able to offer mounts for as many smartphone models as possible, it makes sense to diversify the mounts provided in the store. Thus, the mounts can have receptacles which are constructed for accommodating one or a plurality of smartphone models in each case. To this end, the receptacles are adapted to the external shape of the models and also the position and shape of the interface of the model. Thus, the payment system according to the invention can continually be adapted to newly released smartphones.

It is advantageous if a suitable mount can be assigned to the mobile telecommunications terminal device used by the customer without a large outlay. The simplest solution for this is a labelling of the mounts, through the use of which it is possible to see the model for which it is suitable. If the mounts are stored in a scanner wall, the respective mounts can be stored in various sections of the scanner wall provided therefor.

Advantageously, the customer identifies themselves on the scanner wall, in order to be able to remove a mount. If a mount is only released after the identification of the customer, the customer is compelled to return the mount again after usage. This reliably prevents theft or an inadvertent taking away of the mount. A customer card, with which the customer is registered in the store, is suitable as an identification feature. It is particularly advantageous if the data on the customer card contain information about the smartphone used by the customer. As a result, it is possible after reading the customer card, to indicate one or a plurality of mounts to the customer, the receptacle of which is constructed for the model used by them. Thus, the customer receives a signal, particularly a light signal, on the basis of which they can discover a suitable mount.

Alternatively or additionally, one of the suitable mounts can also be provided for removal by them. This is especially advantageous in particular, if the mounts stored in the scanner wall are secured against unauthorized removal. In this case, one of the suitable mounts is unlocked when the customer card is read, so that the identified customer can remove the same.

Alternatively or additionally to this, a query device can be provided, through the use of which the customer can select a mount suitable for their smartphone. Such a query device can for example be a display, on which various models of smartphones are displayed and can be selected.

Preferably, the mount removed by the customer is assigned to the customer card, so that when the mount is returned, an assignment to the customer card can take place. In this manner, the whereabouts of missing mounts in particular can be traced.

Identification via the telephone number of the smartphone or a so-called personalized app suitable for the identification of a smartphone lends itself as an alternative to identification via the customer card.

Preferably, one or a plurality of the interfaces can also be constructed wirelessly. Corresponding standards for wireless data transmission have been known for a long time. Wireless energy transmission can for example take place via electromagnetic induction or coil resonance. The components required for this can be disposed on the mount or integrated into the same without a large outlay. The wireless connection has the advantage that it is not reliant on a physical coupling of the interfaces, so that the position of the mobile terminal device is more flexible.

Optionally, the issuing station charges the energy storage devices present in the preferred embodiment of the mount. Thus, it is ensured that the mount issued to the customer has sufficient energy during the shopping in order to supply the mobile terminal device and/or the shopping cart and/or its own functionalities with energy.

It is particularly advantageous if the energy storage device, particularly the charge status thereof, is checked prior to or during the issuing of a mount. This allows a selection of available mounts, so that mounts are only issued if the energy storage device thereof is sufficiently full. In this manner, mounts having an energy storage device which is not sufficiently full can be charged further. Alternatively, the energy storage device of the mount can be replaced. The inspection of the energy storage device therefore makes it possible to only release the mounts for issuing if the energy storage device thereof has sufficient energy for a use cycle.

The customer can then use their mobile terminal device as a self-scanner during their shopping. When the shopping is finished, they continue to the point-of-sale counter. The actual payment procedure is started in that they hand over the mount to the point-of-sale personnel. Inserted into an interface conceived therefor on the point-of-sale system, a connection is created between the point-of-sale system and the mount or mobile terminal device and the data are read.

A particular advantage in the case of the presence of point-of-sale personnel during the payment procedure is the fact that a check with a comparison between goods and the point-of-sale receipt is possible by visual inspection.

The advantages of this system are clear. To pay, the customer no longer has to take the goods out of the shopping cart again and load the same again. They can already sort them in the shopping cart in the manner they desire during the shopping. Furthermore, the payment procedure is accelerated considerably. The point-of-sale personnel no longer have to grip each separate item of goods, scan in the same and discard the same again, but rather merely have to scan in the data and collect the displayed amount. Due to the considerably shortened procedure, a fraction of the previously required point-of-sale personal is able to perform the same work. In addition, it was possible to determine that self-scanning customers have a higher purchase value than conventionally paying customers. Thus, offering a self-scanning system also increases the turnover per customer.

Self-scanning systems also provide further advantages. Usually, the customer places the goods selected by them into the shopping cart in a particular sorted order, for example heavy goods at the bottom, pressure-sensitive goods at the top. This sorted order is reversed when the customer has to place their goods onto a point-of-sale conveyor belt. In this reversed sequence, the goods are scanned by the point-of-sale personnel. The customers standing further back in the queue in this case create a time pressure, which does not allow the re-sorting of the goods placed on the removing conveyor belt by the point-of-sale personnel after the scanning. For the most part they end up in the shopping cart in the sequence in which the customer is able to collect them. Only later, when packing into bags or loading the car, can they be re-sorted. Thus, the customer was virtually required to handle the goods bought by them in a careless manner. That is avoided in the case of self-scanning systems.

It is fundamentally possible to automate the entire payment procedure further and to carry out the same at an automatic station without point-of-sale personnel. At such a self-checkout station, the customer connects the mount to a corresponding interface on the station. After connection, the data, particularly the individual items and the total amount can be read out. The customer pays with a permissible payment device and returns the mount in exchange for a receipt. The use of self-checkout stations additionally reduces the personnel requirement.

In accordance with an added feature of the mount of the invention, the mount preferably includes a second fastening device for the releasable locking of the mobile terminal device on the mount. Such locking has the advantage that the customer is protected from theft. They can prevent their locked mobile terminal device from being stolen when unattended.

In accordance with an additional particularly preferred feature of the mount of the invention, the second fastening device has a clip closure, using which at least a partial region of the terminal device can be enclosed and which in the closed state locks the mobile terminal device held in the receptacle of the mount. When configuring the receptacle for the mount and the second fastening device or fastener, it is to be ensured that the camera of the mobile terminal device is not covered.

Preferably, the lock can be locked by actuating two mutually oppositely disposed buttons on the receptacle. The mutually spaced buttons are simple to operate and simultaneously prevent an unintended locking of the lock by inadvertent touching. Furthermore, they compel the customer to hold their open hand in front of the receptacle when opening or closing the lock, as a result of which an inadvertent falling of the mobile terminal device out of the receptacle is prevented.

Additional security results if the mechanism to be actuated for releasing the lock can be blocked. Blocking makes it possible for the customer to move freely in the store and also let their mobile terminal device located in the mount out of their sight once without feeling uneasy.

Such a block is a fingerprint reader integrated into the mount or disposed on the shopping cart. A further option resides in controlling the unlocking function via an app, which is supplied by the trading company for example. The mount makes it possible to provide such electronic securing and unlocking functions on the shopping cart. The energy storage device of the mount ensures that the shopping cart and the components thereof are reliably supplied with energy. In particular, the energy is always supplied when the mount and thus the shopping cart are used by a customer. Thus, the mount enables a provision of electrical and/or electronic functions on the shopping cart in a simple manner.

Preferably, the shopping cart, particularly the shopping-cart handle, has a separate energy storage device, which is charged via the energy storage device of the mount. This separate energy storage device makes it possible to operate electrical and/or electronic functions on the shopping cart even without the connection of the mount. For example, the separate energy storage device makes it possible to even display information on an electronic display fastened on the shopping cart if the mount has been detached from the shopping cart again.

As an alternative to automatic blocking, blocking of the mechanism is carried out manually. A combination lock can be provided for this purpose, for example. The combination lock is set after the locking and can only be opened again by using the numerical sequence known to the customer.

In accordance with yet another preferable feature of the mount of the invention, the first fastening device includes pins or mandrels, which secure the mount in an opening of the shopping cart, particularly in an opening of a shopping-cart handle, by spreading. A receptacle for the mount is thus provided on the shopping cart or shopping-cart handle, the shape of which corresponds to the pins or mandrels. Such a fastening offers secure protection against undesired releasing of the mount, with the corresponding security provisions against unauthorized removal as well.

In accordance with yet a further advantageous feature of the mount of the invention, the first and the second fastening devices are connected to one another, so that locking of the second fastening device triggers locking of the first fastening device. The customer using the mount in this case only has to operate one element, in order to lock both closures.

In accordance with yet an added advantageous feature of the mount of the invention, the spreading of the pins or mandrels can be connected in a simple manner with the mechanism for locking the clip closure. The movement of the clip closure when pressing down for partial enclosure of the mobile terminal device can be converted without a large construction outlay into a spreading of the pins or mandrels at the opposite end of the mount.

In accordance with yet an additional preferred feature of the mount of the invention, the first and/or the second fastening device are electronically unlocked. The electronic unlocking offers the advantage that the customer does not have to concern themselves with the function of the unlocking mechanism. The customer merely has to trigger the electronic unlocking. No further understanding of the mechanical processes and relationships is required. This makes the electronic unlocking particularly convenient for the customer. Furthermore, incorrect operation is reliably prevented, as a result of which the personnel outlay for necessary explanations and assistance is reduced considerably.

If the locking or unlocking mechanism of the first fastening device is not disposed on the shopping cart, but rather on the mount, it is advantageous to also place the electronic unlocking function of the first fastening device on the mount.

The energy necessary for the electronic unlocking is usually available via the energy storage device of the mount. Alternatively, if available, recourse can be had to energy from the energy storage device of the shopping cart. This can be provided for example if the energy storage device of the mount no longer has sufficient energy. Likewise, it is possible for the unlocking process to have recourse to the energy storage device of the mobile terminal device connected to the mount. If no energy is available in spite of all this, it should still be possible for the lock to be released mechanically.

Preferably, the electronic unlocking is controlled via an app of the mobile terminal device. If the mobile terminal device is connected to the mount, the app running on the mobile terminal device can access the electronic unlocking and trigger the same. A particularly simple measure is the triggering via a code, which is input on the mobile terminal device. To do this, the customer merely has to define the code desired by them, for example a numerical combination, in the app. The app can also provide various unlocking processes and to do this query various codes, for example the unlocking of only the mobile terminal device or the terminal device and the mount. The input of the respective code into the app then triggers the desired unlocking. In the event that the customer has forgotten their code, the retailer can store a type of master key or code, by using which the locks are to be released. In order to prevent this, it is advantageous to require the customer to input the code defined by them for checking or define a new one when connecting the mobile terminal device to the mount.

Such an app can be offered by the retailer for download, for example via their Internet page. This makes it possible for the customer to already input the required data into the app in advance. In particular, the electronic unlocking function can also be integrated into a more comprehensive app of the retailer, which is offered by the same for installation. With such an app, a collection of various functions offered by the retailer, which relate to shopping, are provided to the customer.

It is particularly advantageous if the app is stored in a data memory of the mount. Then it may be offered to the customer for installation when connecting the mount to their mobile terminal device. This offer appeals in particular to a first-time customer or a customer who was heretofore unaware of the retailer's range on the Internet. As a result, they are placed in a position to install the app without any great outlay and at the instant when they can use it. The customer can input the data required by the app during or subsequently to the installation. This offer increases the preparedness of the customer to install the app of the retailer and thus contributes to the propagation thereof and the improved customer loyalty due to the use thereof.

In this connection, it should of course be checked if the offer should not be installed, because an app of the retailer is already present on the mobile terminal device. It is likewise possible to check whether a new version is available for the app which is present and which can be offered as an update. In this manner it can be ensured that the customers use the respectively current app.

Likewise, it is advantageous if the app is opened and activated by the connection between the mobile terminal device and the mount. The customer can then immediately access the functions provided by the app and does not have to start the app in the store of the retailer.

Alternatively or additionally, the app can be offered for installation upon connection of the mobile terminal device to a network of the retailer, which is provided via wireless near field communication.

In accordance with again another particularly advantageous feature of the mount of the invention, the mount has a data processing unit and a data memory. Thus, the mount has a separate computing and storage capacity. The functionality thereof therefore goes beyond the provision of mechanical and electronic interfaces. For example, information can be transmitted to the customer via the data memory and the computing unit, which information is displayed to them on their mobile terminal device or output as speech. The computing unit can also be used for controlling or analyzing a GPS receiver, transponder or scanner disposed on the shopping cart. Furthermore, it becomes possible to store the data scanned via the mobile terminal device in the data memory. For the payment procedure, it is then merely necessary to connect the mount to the point-of-sale system and to read the data out from the data memory. The mobile terminal device can remain with the customer.

In accordance with a concomitant preferred feature of the mount of the invention, the mount has a fifth interface for transmitting data from the shopping cart to the mount. Such an interface can be used to read data of a scanner strip running around the basket of the shopping cart. In this case, the scanner strip generates an electromagnetic field, using which transponders of the goods placed in the shopping cart can be read. It is particularly advantageous in this case that the energy required for operating the scanner strip can be supplied by the mount.

In a further embodiment, the shopping cart is equipped with solar cells as a separate energy source. The energy generated by the solar cells is then available to the functions of the shopping cart and/or the mount and/or the mobile terminal device. The solar cells can be protected from damage in a simple manner in that the same are integrated into the shopping-cart handle. This integration has the further advantage that the lines for fastening the mount on the handle can likewise be integrated into the handle and do not have to be attached subsequently.

In an alternative exemplary embodiment to the wired exemplary embodiment, the data exchange between interfaces takes place wirelessly, for example by using known systems of wireless near-field communication.

The payment system according to the invention makes it possible for wholesale and retail to offer their customers a simple payment system, which is readily used by the same and which can be operated without a large personnel requirement.

Since the connectors of mobile terminal devices available on the market do not match, it is recommended to retain various mounts for various terminal device types. The various mounts in each case have a standardized interface for the point-of-sale system and an interface adapted to a particular terminal device type.

The system furthermore offers great future-proofing, as the mobile terminal devices are constantly being developed further. Thus, wholesale and retail using the system or the mount is constantly up to date with the technology, without having to invest a great deal of their own funds in this technology.

Other features which are considered as characteristic for the invention are set forth in the appended claims.

Although the invention is illustrated and described herein as embodied in a mount for a mobile terminal device for use as a self-scanner, a payment system, a mobile telecommunications terminal device, a scanner wall and software for locking and/or unlocking the mount, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
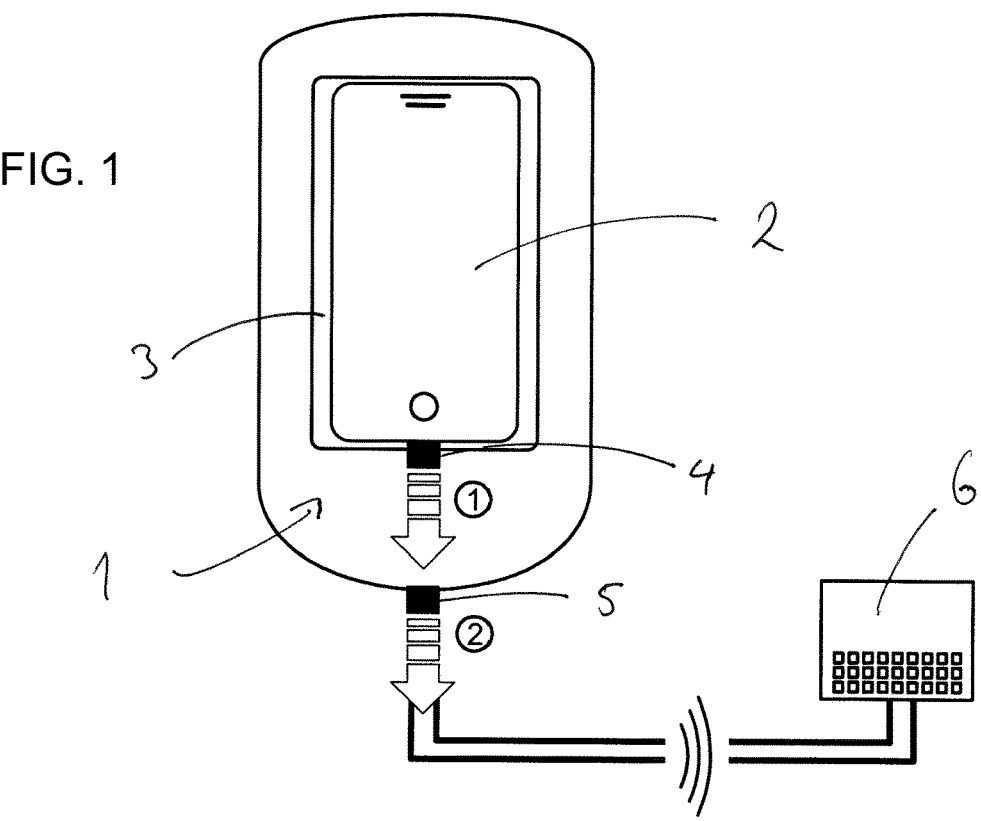
FIG. 1 is a diagrammatic, top-plan view of a mount according to the invention interfaced with a point-of-sale system.
Figure 2:
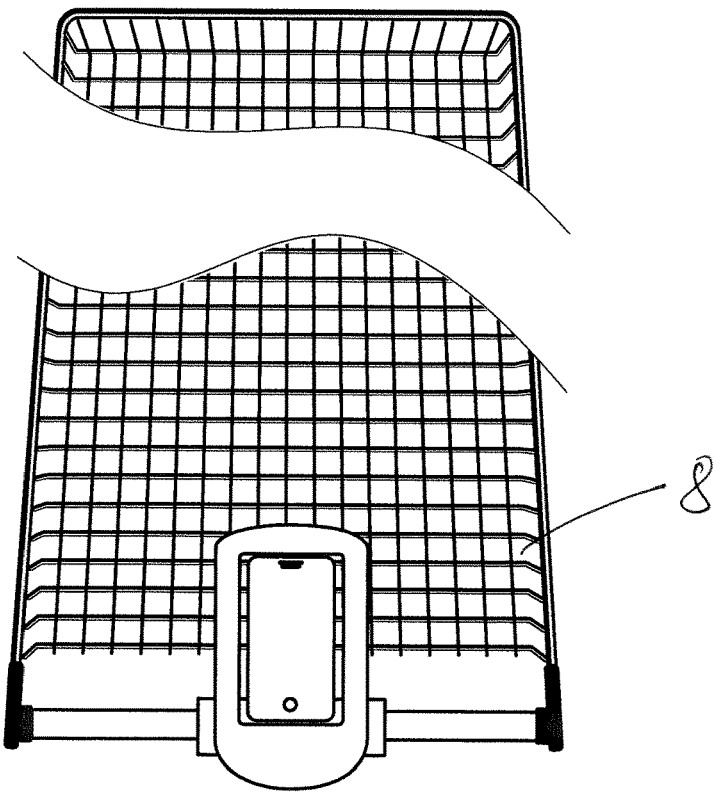
FIG. 2 is a partly broken-away, top-plan view of a shopping cart having the mount.

Referring now to the figures of the drawings in detail and first, particularly, to FIGS. 1 and 2 thereof, there is seen a mount 1 for a mobile telecommunications terminal device 2. The mount 1 includes a receptacle 3 for the mobile telecommunications terminal device 2, a first interface 4 for transmitting data from the mobile telecommunications terminal device 2 to the mount 1 and a second interface 5 for transmitting data from the mount 1 to a point-of-sale system 6. The mount also includes a first fastening device 7 for the releasable fastening of the mount 1 on a shopping cart 8.

Figure 3:
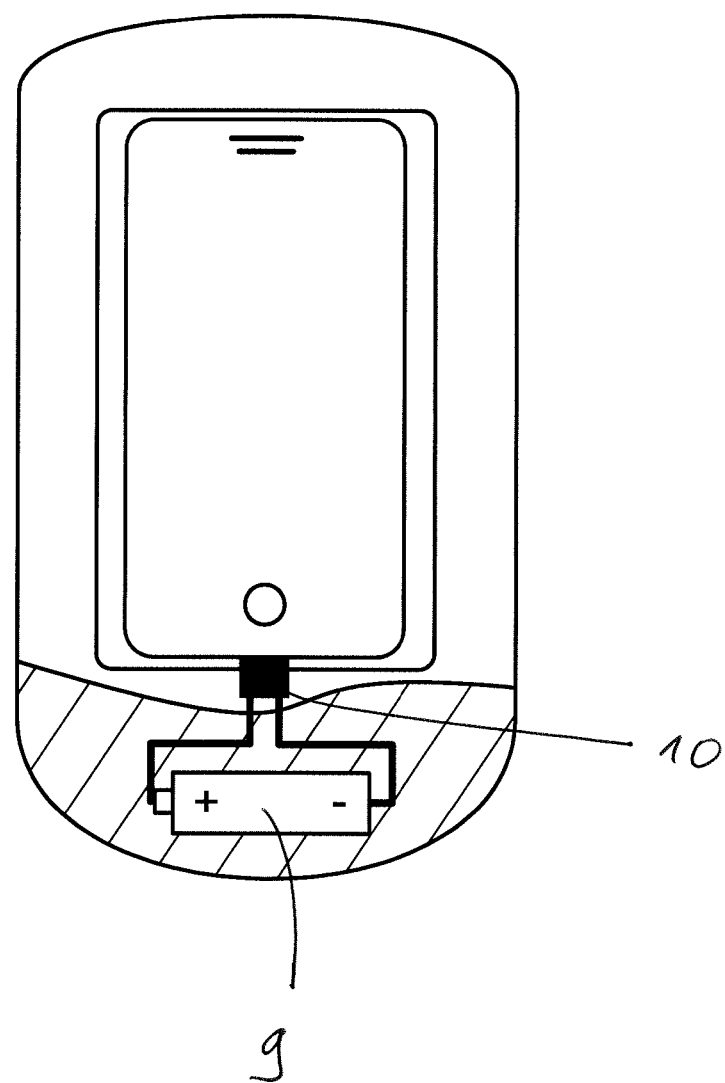
FIG. 3 is a top-plan view of the mount having an energy storage device.
Figure 4:
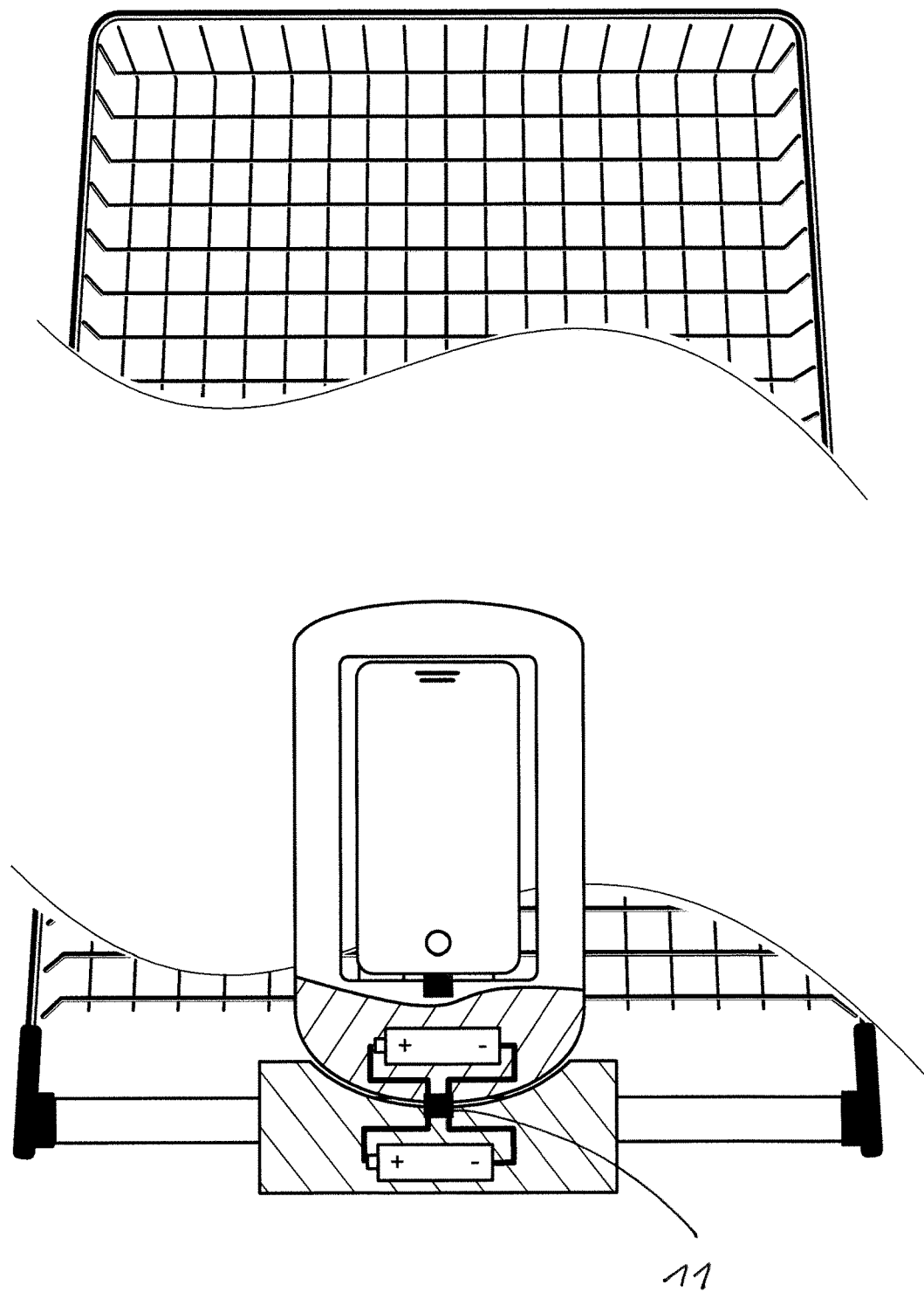
FIG. 4 is an enlarged, partly broken-away, top-plan view of the shopping cart having the mount.

FIG. 3 shows that the mount 1 has an energy storage device 9, such as a battery, and a third interface 10 for transmitting energy to the mobile telecommunications terminal device 2.

FIG. 3 shows that the mount 1 includes a fourth interface 11 for transmitting energy to the shopping cart.

Figures 5A, 5B:
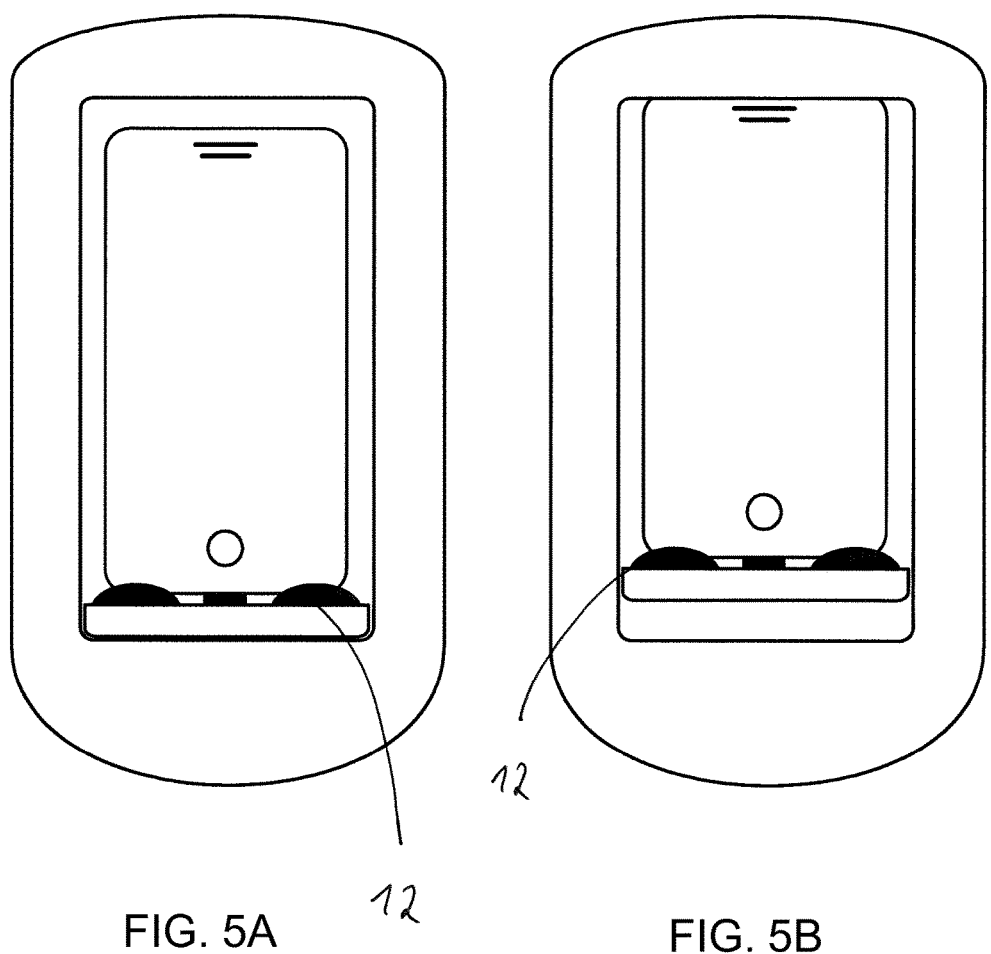
FIGS. 5A and 5B are top-plan views of the mount showing a second fastening device in engaged and disengaged conditions.

FIGS. 5A and 5B show that the mount 1 includes a second fastening device 12 for the releasable locking of the mobile telecommunications terminal device on the mount. The second fastening device 12 is shown in the locked condition in FIG. 5A and in the released condition in FIG. 5B.

Figures 6A, 6B:
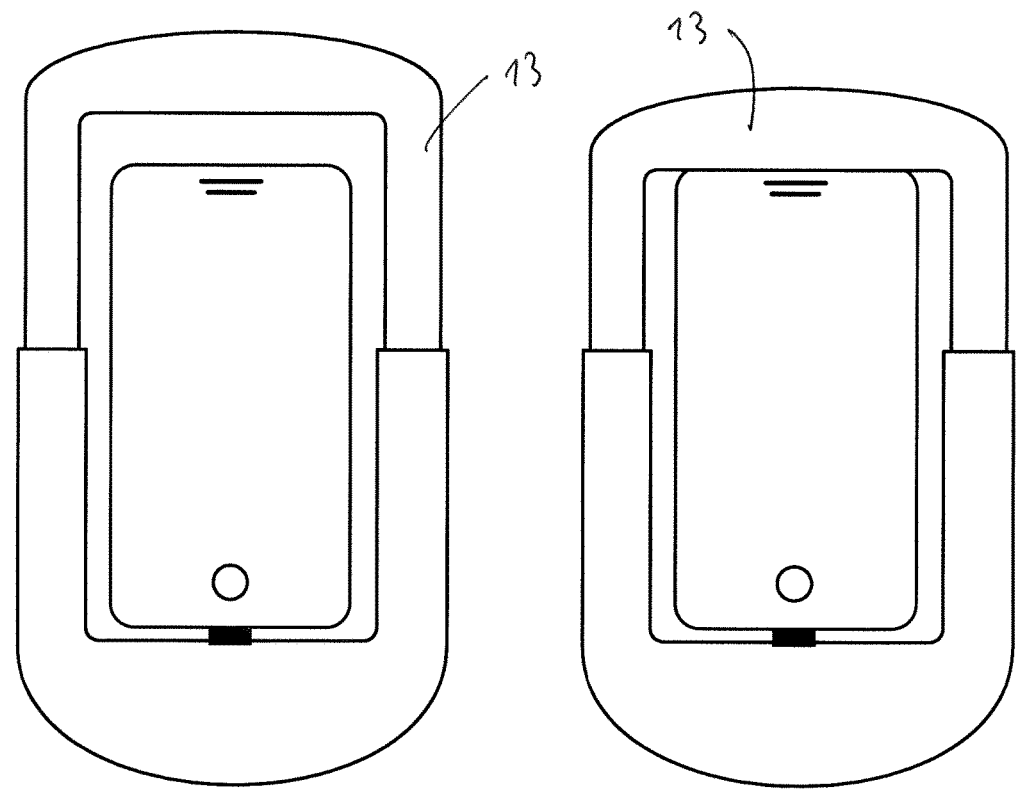
FIGS. 6A and 6B are top-plan views of the mount showing a clip closure in engaged and disengaged conditions.

As is seen in FIGS. 6A and 6B, the second fastening device 12 has a clip closure 13 which is in an open state in FIG. 6A and is in a closed state in FIG. 6B, in which it locks the mobile telecommunications terminal device 2 held in the receptacle 3.

Figure 7:
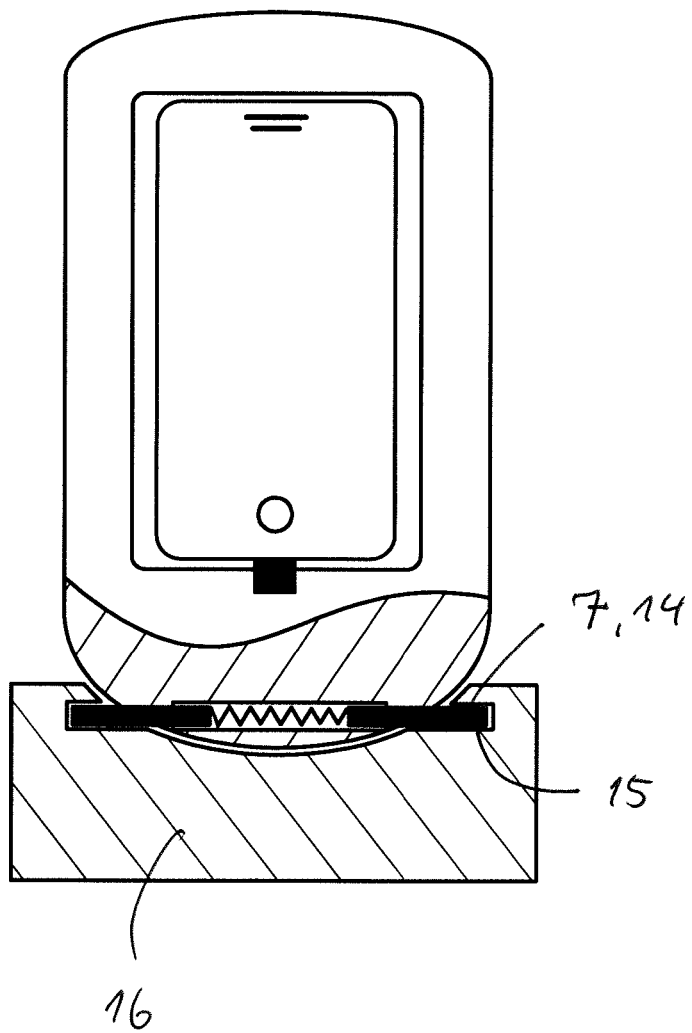
FIG. 7 is a top-plan view of the mount having pins securing the mount in an opening of a shopping-cart handle.

FIG. 7 shows that the first fastening device 7 includes pins 14, which secure the mount 1 in an opening 15 in a shopping-cart handle 16.

Figure 8:
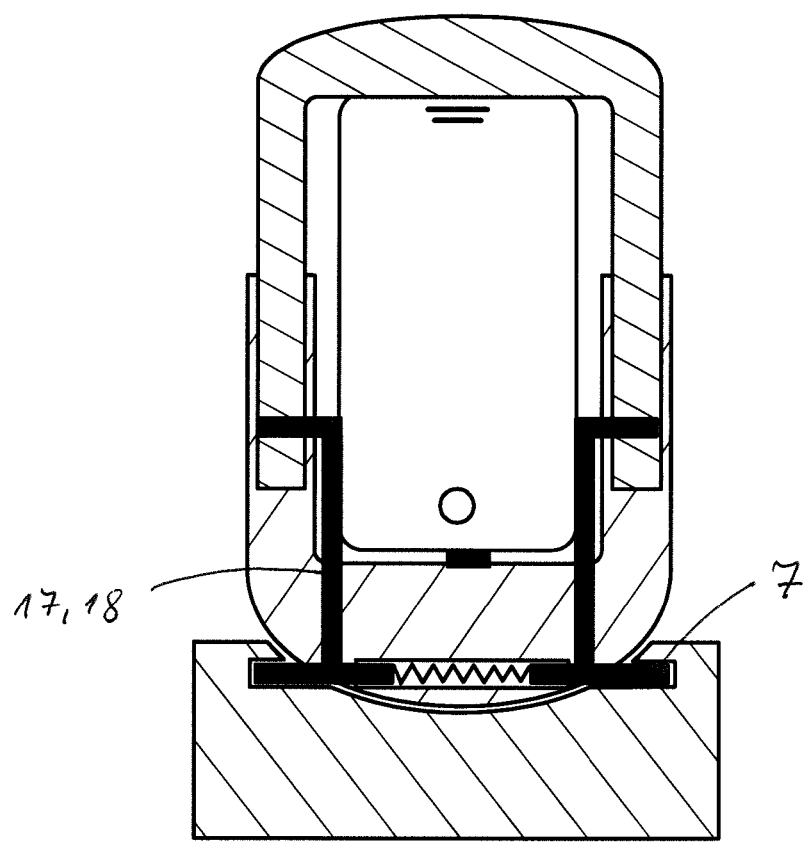
FIG. 8 is a top-plan view of the mount showing an interaction between the partly-engaged clip closure and the pins.
Figure 9:
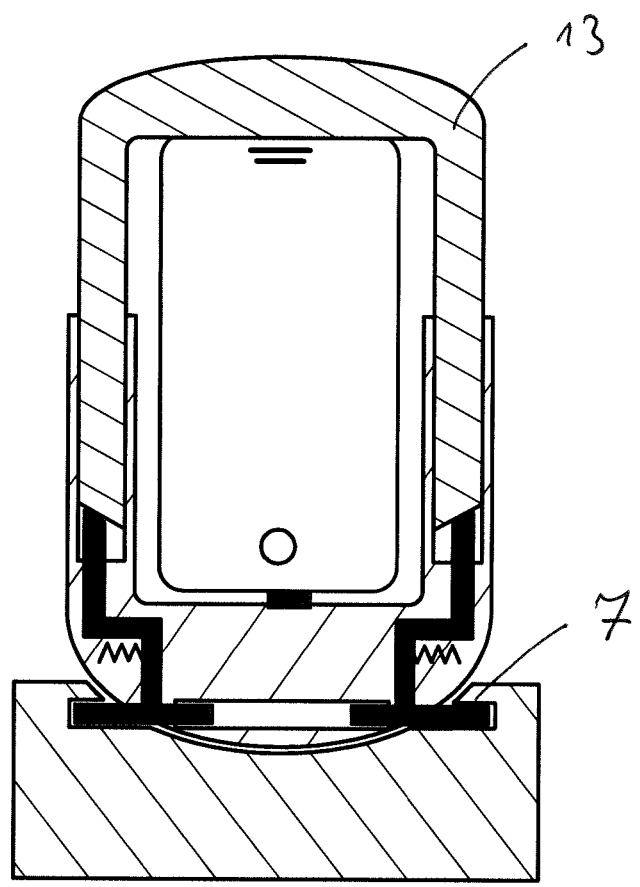
FIG. 9 is a view similar to FIG. 8 with the clip closure fully engaged.

According to FIG. 8, the first and second fastening devices 7, 12 are interconnected at a connection 17, so that locking of the second fastening device 12 triggers locking of the first fastening device 7. The clip closure 13 interacts with the pins 14 at a location 18 in such a manner that when the clip closure locks by pressing down, the pins are spread. Whereas FIG. 8 shows the clip closure 13 in a raised position, it is pressed-down in FIG. 9.

In addition, the first fastening device 7 and/or the second fastening device 12 can be locked and/or unlocked electronically. To that end, the mount 1 shown in FIG. 10 has a data processing unit 19 and a data memory 20. A software application for the electronic locking and/or unlocking of a mount 1 is stored in the data memory 20 of the mount 1. The mount additionally has a fifth interface 21 for transmitting data from the shopping cart to the mount.

A payment system for wholesale and retail according to the invention includes the mobile telecommunications terminal device 2, the mount 1 for the mobile telecommunications terminal device 2 and the point-of-sale 6 system having the interface 5 for transmitting data from the mount to the point-of-sale system, as seen in FIG. 1.

Figure 10:
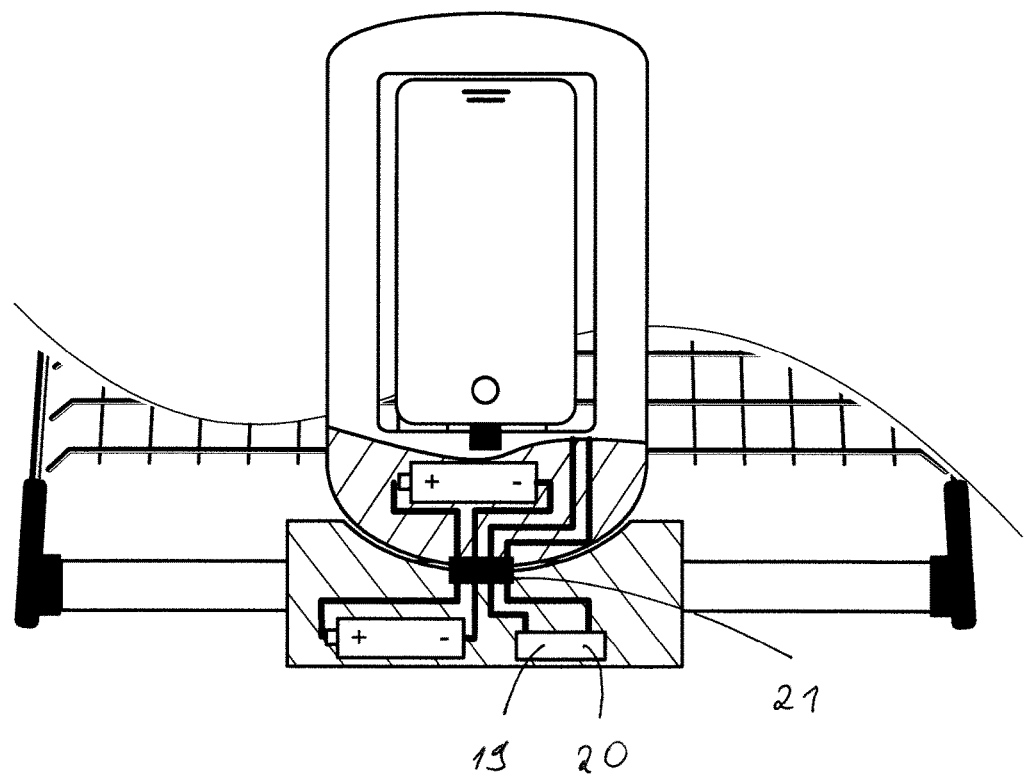
FIG. 10 is a partly broken-away, top-plan view of the shopping cart and the mount having a data processing unit and a data memory.
Figure 11:
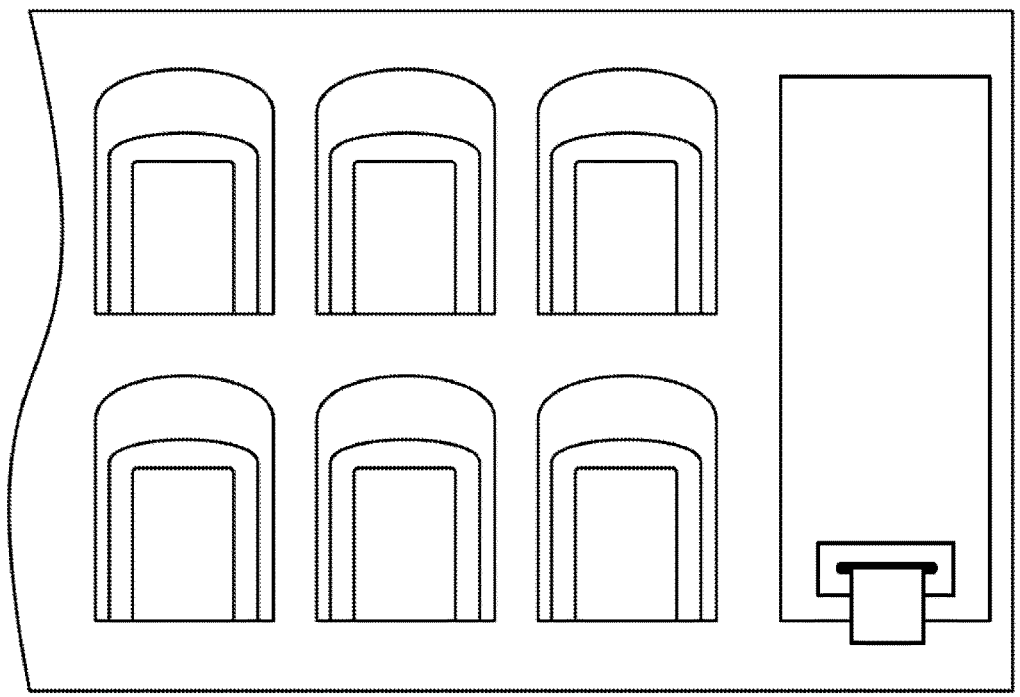
FIGS. 11 and 12 are front-elevational views of a scanner wall holding mounts and having a device for identifying a customer, in non-signaling and signaling conditions.
Figure 12:
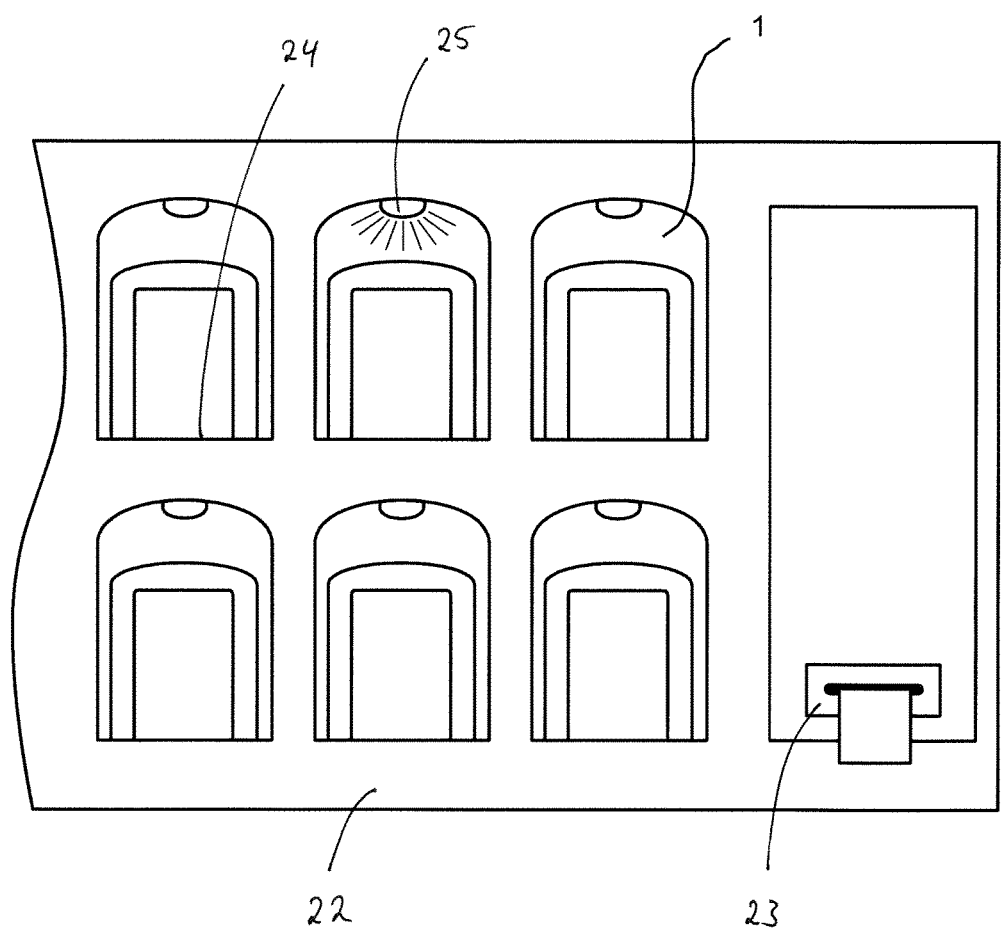

The mobile telecommunications terminal device 2, which is connected to the mount 1, may be used as a self-scanner. To that end, FIGS. 10 and 11 show a scanner wall 22 for accommodating a multiplicity of mounts 1 according to the invention. The scanner wall has device 23 for identifying a customer and a device 24 for releasing a certain one of the mounts stored in the scanner wall when a customer is identified. The scanner wall also includes a signal device 25 which indicates a certain one of the mounts stored in the scanner wall when a customer is identified, as is shown in FIG. 12.

The invention claimed is:

1. A mount for a mobile telecommunications terminal device, the mount comprising:
   a receptacle configured to receive the mobile telecommunications terminal device of a customer;
   a first interface configured to transmit data from the mobile telecommunications terminal device to the mount;
   a second interface configured to transmit data from the mount to a point-of-sale system; and
   a first customer specific fastening device configured for releasably locking the mount on a shopping cart and for blocking an unlocking of the locking of the mount which is not authorized by the customer;

a second customer specific fastening device configured for releasably locking the mobile telecommunications terminal device on the mount and blocking an unlocking of the mobile telecommunications device from the mount which is not authorized by the customer.

2. The mount according to claim 1, which further comprises an energy storage device, and a third interface configured to transmit energy to the mobile telecommunications terminal device.

3. The mount according to claim 2, which further comprises a fourth interface configured to transmit energy to the shopping cart.

4. The mount according to claim 1, wherein said second fastening device has a clip closure, said clip closure has a closed state, and said clip closure locks the mobile telecommunications terminal device held in said receptacle in said closed state.

5. The mount according to claim 1, wherein said first fastening device includes pins securing the mount in an opening in a shopping-cart handle.

6. The mount according to claim 1, wherein said first and second fastening devices are connected to one another, and locking of said second fastening device triggers locking of said first fastening device.

7. The mount according to claim 6, wherein:
said second fastening device has a clip closure, said clip closure has a closed state, and said clip closure locks the mobile telecommunications terminal device held in said receptacle in said closed state;
said first fastening device includes pins securing the mount in an opening in a shopping-cart handle; and
said clip closure interacts with said pins causing said pins to spread when said clip closure locks by pressing down.

8. The mount according to claim 1, wherein at least one of said first fastening device or said second fastening device is configured to be at least one of locked or unlocked electronically.

9. The mount according to claim 1, which further comprises a data processing unit and a data memory associated with the mount.

10. The mount according to claim 1, which further comprises a fifth interface configured to transmit data from the shopping cart to the mount.

11. A payment system for wholesale and retail, the payment system comprising:
a mobile telecommunications terminal device;
a mount according to claim 1 for said mobile telecommunications terminal device; and
a point-of-sale system having an interface configured to transmit data from said mount to said point-of-sale system.

12. A mobile telecommunications terminal device, comprising:
a self-scanner connected to the mount according to claim 1.

13. A scanner wall, comprising:
a multiplicity of mounts according to claim 1; and
a device for identifying a customer.

14. The scanner wall according to claim 13, which further comprises a device for releasing a mount, said device for releasing a mount configured to release a certain one of the mounts stored in the scanner wall when a customer is identified.

15. The scanner wall according to claim 13, which further comprises a signal device configured to indicate a certain one of the mounts stored in the scanner wall when a customer is identified.

16. A mount for a personal mobile telecommunications terminal device owned by a customer, the mount comprising:
a receptacle configured to receive the personal mobile telecommunications terminal device;
a first interface configured to transmit data from the personal mobile telecommunications terminal device to the mount;
a second interface configured to transmit data from the mount to a point-of-sale system; and
a first customer specific fastening device configured for releasably locking the mount onto a shopping cart and allowing removal of the mount from the shopping cart, the first customer specific fastening device blocking an unlocking of the locking of the mount and preventing a removal of the mount from the shopping cart which is not authorized by the customer;
a second customer specific fastening device configured for releasably locking the mobile telecommunications terminal device on the mount and blocking an unlocking and removal of the personal mobile telecommunications device from the mount which is not authorized by the customer.

* * * * *